(12) United States Patent
Shimakawa

(10) Patent No.: US 11,714,242 B2
(45) Date of Patent: Aug. 1, 2023

(54) OPTICAL FIBER ARRAY AND OPTICAL FIBER CONNECTION STRUCTURE

(71) Applicant: SUMITOMO ELECTRIC INDUSTRIES, LTD., Osaka (JP)

(72) Inventor: Osamu Shimakawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/752,572

(22) Filed: May 24, 2022

(65) Prior Publication Data

US 2022/0381995 A1  Dec. 1, 2022

(30) Foreign Application Priority Data

May 26, 2021 (JP) .................. 2021-088743

(51) Int. Cl.
  *G02B 6/38* (2006.01)
  *G02B 6/02* (2006.01)
  *G02B 6/40* (2006.01)

(52) U.S. Cl.
  CPC ....... *G02B 6/3822* (2013.01); *G02B 6/02004* (2013.01); *G02B 6/3853* (2013.01); *G02B 6/3861* (2013.01); *G02B 6/403* (2013.01)

(58) Field of Classification Search
  CPC .............. G02B 6/02004; G02B 6/3822; G02B 6/3853; G02B 6/3861; G02B 6/403
  See application file for complete search history.

(56) References Cited

U.S. PATENT DOCUMENTS

| 9,494,738 B1 * | 11/2016 | Farmer | H01S 5/4012 |
| 2002/0094172 A1 | 7/2002 | Brun et al. | |
| 2007/0041083 A1 * | 2/2007 | Di Teodoro | C03B 37/10 |
| | | | 359/333 |
| 2012/0073331 A1 | 3/2012 | Tachikura et al. | |
| 2012/0127563 A1 * | 5/2012 | Farmer | G02B 6/14 |
| | | | 359/341.3 |

FOREIGN PATENT DOCUMENTS

| CN | 112987187 A * | 6/2021 | ........... G02B 6/3512 |
| JP | H04-260007 A | 9/1992 | |
| JP | 2012-073408 A | 4/2012 | |
| WO | WO-2017195636 A1 * | 11/2017 | ............... G02B 6/26 |
| WO | WO-2018181782 A1 * | 10/2018 | ............... G02B 6/02 |

* cited by examiner

*Primary Examiner* — Daniel Petkovsek
(74) *Attorney, Agent, or Firm* — Oliff PLC

(57) ABSTRACT

An optical fiber array includes a plurality of single-core fibers each having a core and a cladding and each having, in a distal end surface thereof, a beam expanding portion capable of expanding a mode field diameter (MFD) of light propagating in the core, and a ferrule having an optical fiber holding hole into which the plurality of single-core fibers are inserted, and an end surface in which the optical fiber holding hole opens. A cladding diameter of each of single-core fiber in the beam expanding portion decreases toward the distal end surface. The optical fiber holding hole has a tapered portion whose inner diameter decreases toward the end surface and against which the distal end surfaces abut.

14 Claims, 10 Drawing Sheets

OPTICAL FIBER ARRAY AND OPTICAL FIBER CONNECTION STRUCTURE

CROSS REFERENCE TO RELATED APPLICATIONS

This application claims priority based on Japanese Patent Application No. 2021-088743 filed on May 26, 2021, and the entire contents of which are incorporated herein by reference.

TECHNICAL FIELD

The present disclosure relates to an optical fiber array and an optical fiber connection structure.

BACKGROUND

Patent Document 1 (Japanese Unexamined Patent Application Publication No. H04-260007) discloses a method of expanding a mode field diameter of an optical fiber and an expanding device thereof. The expanding device includes a base and a plurality of optical fiber fixing stands disposed on the base. The optical fiber is fixed to the plurality of optical fiber fixing stands so that the optical fiber extends in a straight line. A portion of the optical fiber located between the optical fiber fixing stands is a coating-removed portion in which a coating of the optical fiber is removed. The expanding device has a microburner which is disposed so as to face the coating-removed portion. The coating-removed portion is heated by the microburner. Due to this heating, an additive in the optical fiber in the coating-removed portion thermally diffuses, and the mode field diameter of the optical fiber is expanded.

Patent Document 2 (Japanese Unexamined Patent Application Publication No. 2012-73408) discloses a processing apparatus to process an end portion of an optical fiber. The processing apparatus has a pair of V-groove portions where the optical fiber having a coating is placed, a space portion located between the pair of V-groove portions, and a pair of lids to press the optical fiber on the V-grooves. The processing apparatus includes discharge electrodes that heat the optical fiber located in the space portion. The discharge electrodes heat the optical fiber to diffuse a dopant added to a core of the optical fiber, thereby increasing a mode field diameter of the fiber. A dopant is added to a cladding. When the discharge electrodes heat the optical fiber, the dopant added to the cladding is diffused to the outside of the optical fiber, and a region of the cladding becomes smaller.

Patent Document 3 (U.S. Patent Application Publication No. 2002/0094172) describes a glass capillary type ferrule that connects a plurality of optical fibers. The ferrule has a hole to hold the plurality of optical fibers. Four or six optical fibers are passed through the hole. Inside the ferrule, a gap is formed between the optical fibers.

SUMMARY

An optical fiber array according to the present disclosure includes a plurality of single-core fibers each having a core and a cladding and each having, in a distal end surface thereof, a beam expanding portion capable of expanding a mode field diameter (MFD) of light propagating in the core, and a ferrule having an optical fiber holding hole into which the plurality of single-core fibers are inserted, and an end surface in which the optical fiber holding hole opens. A cladding diameter of each of single-core fiber in the beam expanding portion decreases toward the distal end surface. The optical fiber holding hole has a tapered portion whose inner diameter decreases toward the end surface and against which the distal end surfaces abut.

A fiber connection structure according to the present disclosure includes the above-described optical fiber array, a multicore fiber, a first lens facing the optical fiber array, and a second lens disposed between the first lens and the multicore fiber.

DETAILED DESCRIPTION

Figure 1:
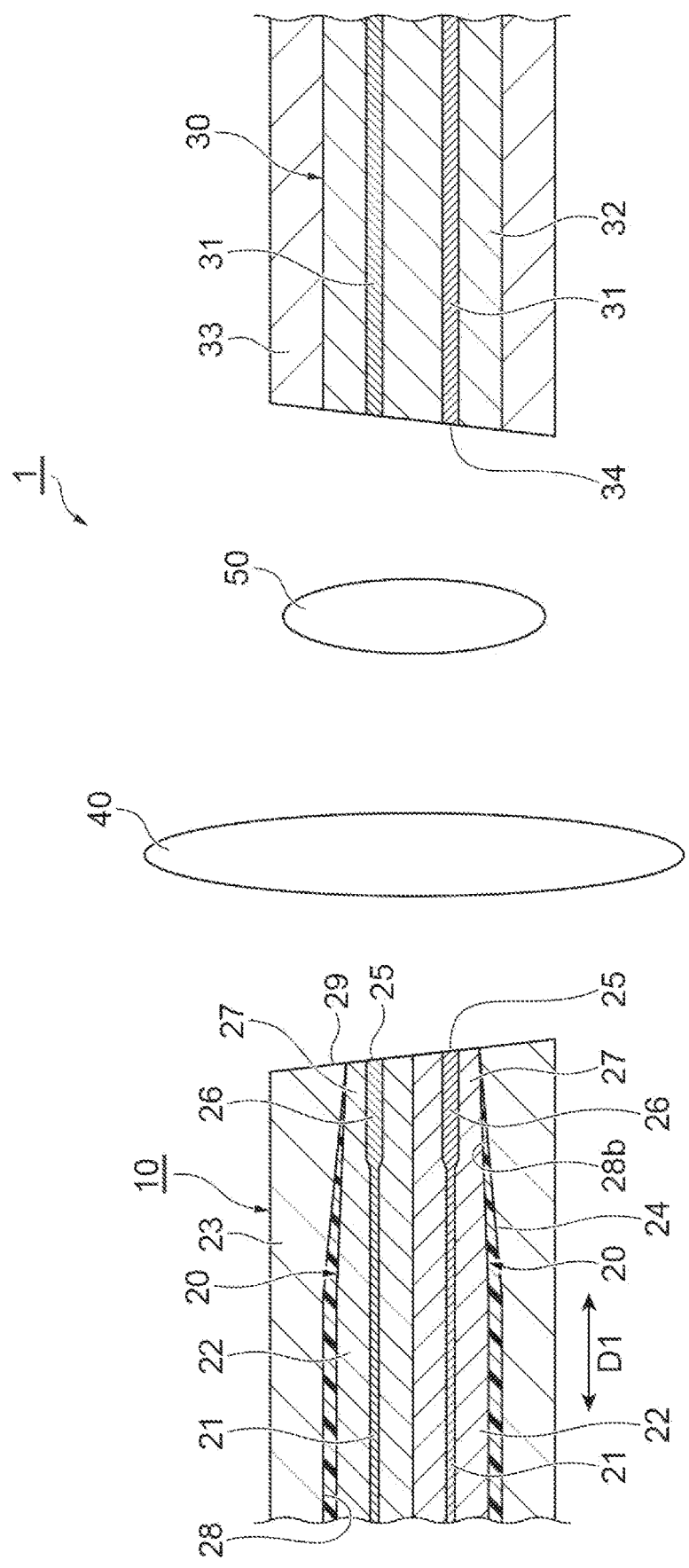
FIG. 1 is a diagram illustrating an optical fiber connection structure according to an embodiment.

When an optical fiber is heated by a microburner to form a beam expanding portion, a cladding diameter of the optical fiber may be reduced. When the cladding diameter of the optical fiber is reduced, a gaps formed between a plurality of optical fibers become larger. When the gaps formed between the optical fibers are large, positional accuracy of the optical fibers may be deteriorated.

An object of the present disclosure is to provide an optical fiber array and an optical fiber connection structure that can increase positional accuracy of a plurality of optical fibers even when a cladding diameters of each of the optical fiber are reduced.

According to the present disclosure, it is possible to improve positional accuracy of the plurality of optical fibers even when the cladding diameters of each of optical fiber are reduced.

DESCRIPTION OF EMBODIMENTS OF THE PRESENT DISCLOSURE

First, contents of embodiments according to the present disclosure will be listed and described. An optical fiber array according to an embodiment of the present disclosure includes a plurality of single-core fibers each having a core and a cladding and each having, in a distal end surface thereof, a beam expanding portion that can expand a mode field diameter (MFD) of light propagating in the core, and a ferrule having an optical fiber holding hole into which the plurality of single-core fibers are inserted and an end surface in which the optical fiber holding hole opens. In the optical fiber array, a cladding diameter of each of the single-core fiber in the beam expanding portion decreases toward the distal end surface. The optical fiber holding hole has a tapered portion whose inner diameter decreases toward the end surface and against which the distal end surfaces abut.

An optical fiber connection structure according to an embodiment of the present disclosure includes the above-described optical fiber array, a multicore fiber, a first lens facing the optical fiber array, and a second lens disposed between the first lens and the multicore fiber.

In this optical fiber array, each of the plurality of single-core fiber has the distal end surface, and the beam expanding portion that can expand the MFD of light propagating in the core is formed in the distal end surface. The plurality of single-core fibers are inserted into the optical fiber holding hole of the ferrule and are held in the ferrule. The cladding diameter of each of single-core fiber in the beam expanding portion decreases toward the distal end surface. The ferrule has the end surface in which the optical fiber holding hole opens. The optical fiber holding hole has a tapered portion whose inner diameter decreases toward the end surface. The tapered portion is a portion against which the distal end surfaces of the single-core fibers abut. Therefore, when the single-core fibers are inserted into the optical fiber holding hole, the distal end surfaces abut against the tapered portion. Accordingly, even when the cladding diameter of each of the single-core fiber is reduced, the positions of the single-core fibers can be fixed by causing the distal end surfaces to abut against the tapered portion. As a result, the positional accuracy of the plurality of single-core fibers can be improved. Since the optical fiber connection structure according to the embodiment includes the above-described optical fiber array, the same advantageous effects as those of the above-described optical fiber array can be obtained.

The plurality of single-core fibers may be in contact with each other at the distal end surfaces. In this case, a gap formed between the single-core fibers can be reduced since the single-core fibers are in contact with each other. As a result, the positional accuracy of the plurality of single-core fibers can be further improved.

A sectional shape of the tapered portion in a plane orthogonal to an optical-axis direction of the plurality of single-core fibers may be a circular shape. In this case, the tapered portion of the optical fiber holding hole can be formed in a simple shape.

A sectional shape of the tapered portion in a plane orthogonal to an optical-axis direction of the plurality of single-core fibers may be a polygonal shape.

An inclination angle of the tapered portion with respect to an optical-axis direction of the plurality of single-core fibers may be from 0.05° to 1°. In this case, when the inclination angle of the tapered portion with respect to the optical-axis direction is 0.05° or more, the distal end surfaces of the single-core fibers inserted into the optical fiber holding hole can abut against the tapered portion. When the inclination angle of the tapered portion with respect to the optical-axis direction is 1° or less, the inclination angle of the tapered portion of the optical fiber holding hole can be prevented from becoming excessively large.

The ferrule may be made of glass. In this case, the ferrule made of glass can be fabricated by a liquid etching process using hydrofluoric acid or the like, and a tapering treatment can also be performed. Since a linear expansion coefficient of the ferrule made of glass is close to a linear expansion coefficient of the optical fiber, for example, characteristics of the optical fiber array including the ferrule made of glass are more stable with respect to a change in environmental temperature.

The ferrule may be made of ceramic. In this case, the ferrule can be easily manufactured by molding, for example, by mixing a ceramic powder with a liquid to form a slurry and pouring the slurry into a die. For example, a ferrule having a tapered tip portion can be easily manufactured by preparing a die having a tapered tip portion.

DETAILS OF EMBODIMENTS OF THE PRESENT DISCLOSURE

Specific examples of an optical fiber array and an optical fiber connection structure according to the present disclosure will be described below with reference to the drawings. The present invention is not limited to the following examples, and is defined by the scope of the claims, and is intended to embrace all the modifications within the meaning and scope equivalent to the scope of the claims. In the description of the drawings, like or corresponding elements are denoted by like reference numerals and redundant descriptions thereof will be omitted. The drawings are partially exaggerated for easy understanding, and dimensional ratios, angles and the like are not limited to those illustrated in the drawings.

FIG. 1 is a diagram illustrating an optical fiber connection structure 1 according to an embodiment. Optical fiber connection structure 1 forms, for example, a fan-in/fan-out (FIFO) device of lens-coupled multicore fiber. Optical fiber connection structure 1 includes an optical fiber array 10 according to the present embodiment, a multicore fiber 30, a first lens 40 facing optical fiber array 10, and second lens 50 disposed between first lens 40 and multicore fiber 30.

Multicore fiber 30 has a plurality of cores 31 and a cladding 32. Multicore fiber 30 is held by, for example, a ferrule 33. Multicore fiber 30 has a distal end surface 34 directed toward a single-core fiber 20. For example, distal end surface 34 is flat, and is inclined with respect to a plane orthogonal to an optical-axis direction D1. That is, a normal line of distal end surface 34 is inclined with respect to optical-axis direction D1. Single-core fiber 20 has a distal end surface 25 directed toward multicore fiber 30. Similarly to distal end surface 34, for example, distal end surface 25 is flat, and a normal line of distal end surface 25 is inclined with respect to optical-axis direction D1.

Second lens 50 is disposed so as to face multicore fiber 30. Second lens 50 condenses a plurality of lights emitted from each of the plurality of cores 31 of multicore fiber 30 on a side opposite to multicore fiber 30. First lens 40 is disposed so as to face single-core fiber 20 in optical-axis direction D1. Both of first lens 40 and second lens 50 are, for example, biconvex lenses.

Optical fiber array 10 includes a plurality of single-core fibers 20, and each of single-core fiber 20 includes a core 21 and a cladding 22. Optical fiber connection structure 1 is a fan-in/fan-out device that divides lights each propagating in multicore fiber 30 into a corresponding fiber of the plurality of single-core fibers 20, or that combines lights each propagating in respective single-core fibers 20 into one multicore fiber 30. A light handled by optical fiber connection structure 1 is, for example, a light having a wavelength of a 1.55 µm band.

Optical fiber connection structure 1 may be used in, for example, an optical amplifier that divides lights each propagating in respective cores 31 of multicore fiber 30 into a corresponding fiber of the plurality of single-core fibers 20 and amplifies each of the split light. Optical fiber connection structure 1 may be used in an optical transmitter that transmits a light from each of the plurality of single-core fibers 20, or may be used in an optical receiver that receives a light from each of the plurality of single-core fibers 20. In optical fiber connection structure 1, multicore fiber 30, second lens 50, first lens 40, and single-core fiber 20 are arranged in this order in optical-axis direction D1. Multicore fiber 30 and single-core fiber 20 are optically coupled (space coupled) to each other through space.

Figure 2:
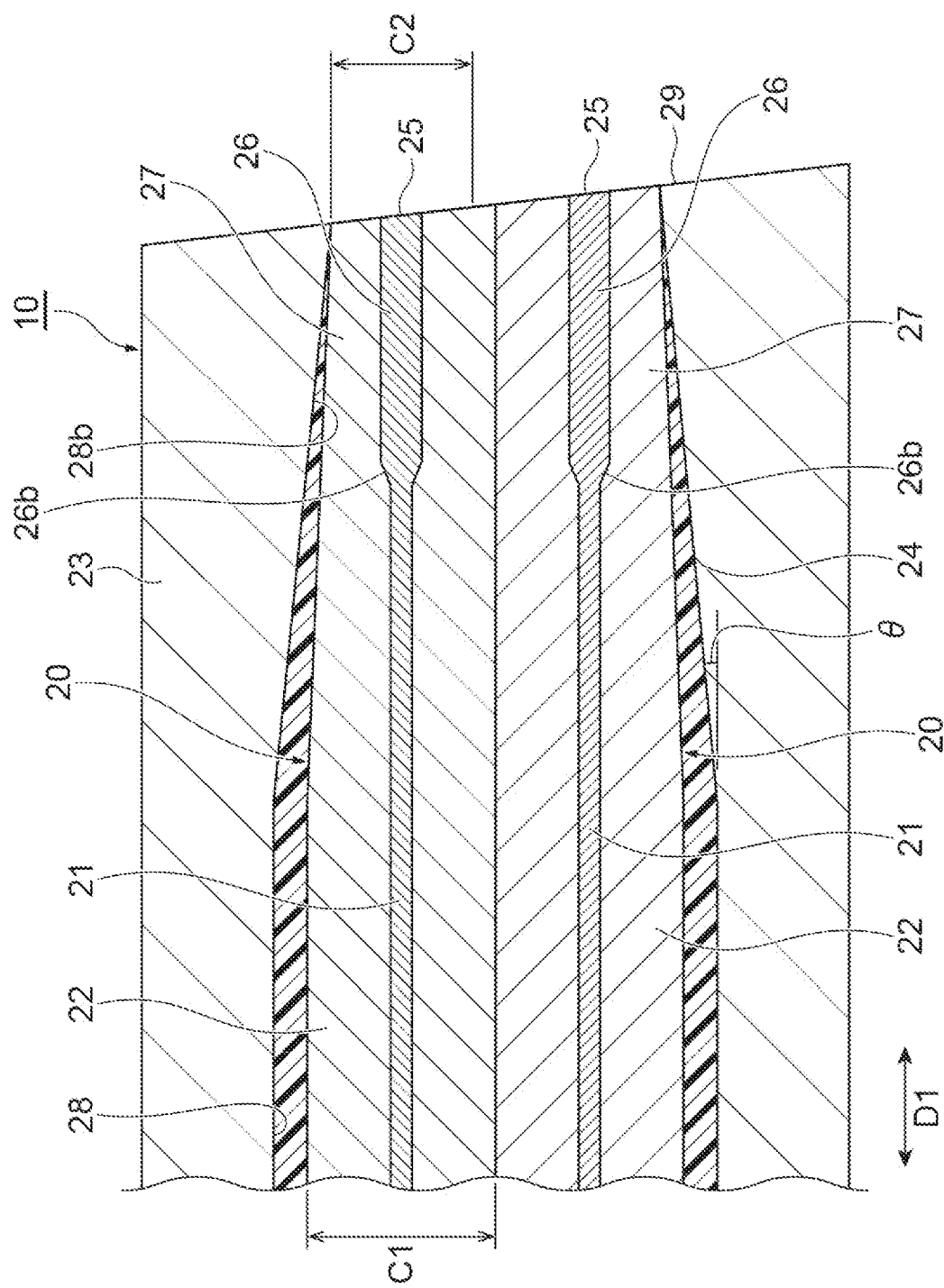
FIG. 2 is a side cross-sectional view illustrating an optical fiber array according to an embodiment.
Figure 3:
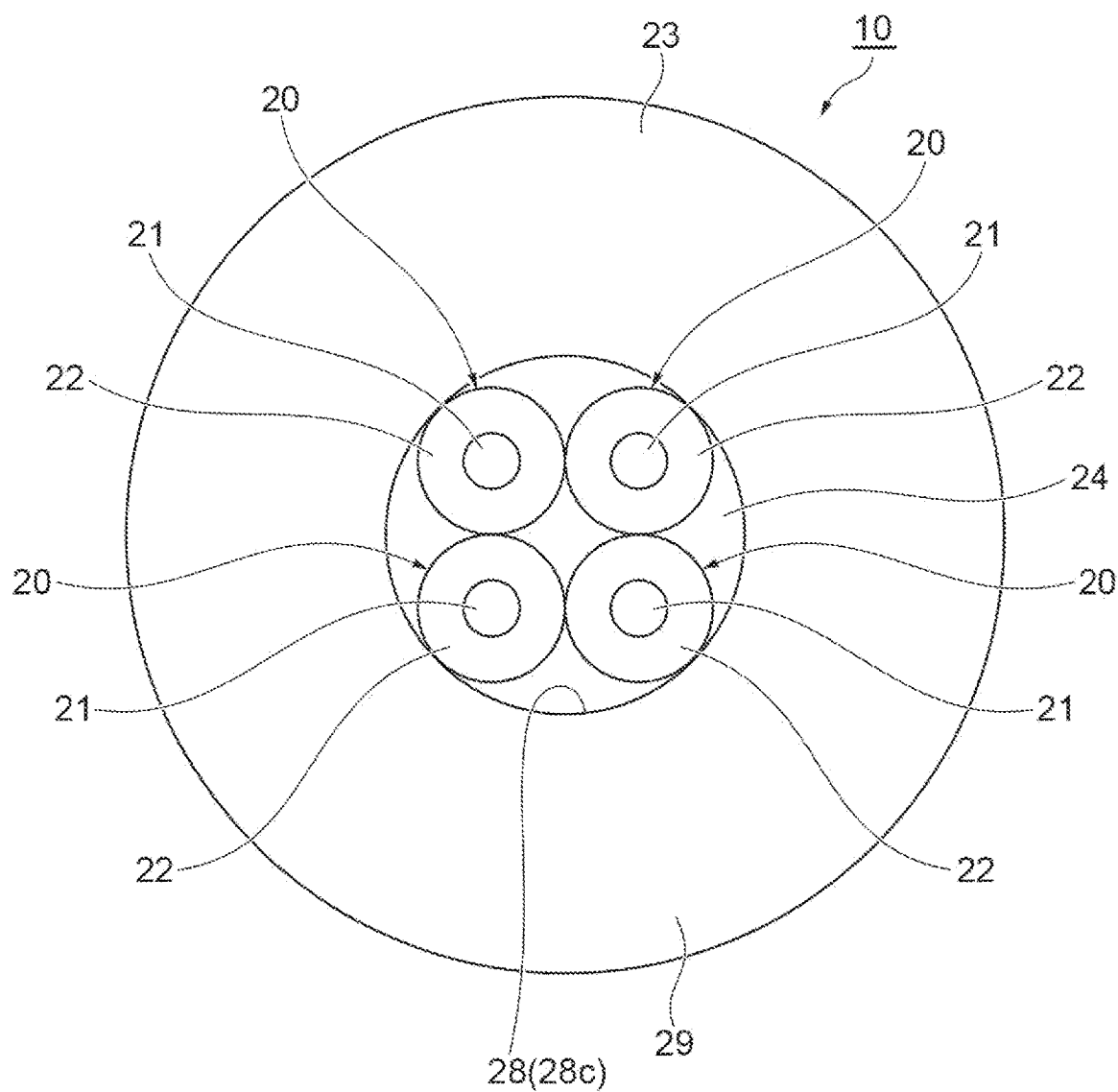
FIG. 3 is a diagram illustrating a ferrule and a plurality of single-core fibers in a plane orthogonal to an optical-axis direction of the single-core fibers according to an embodiment.

FIG. 2 is a diagram illustrating optical fiber array 10. FIG. 3 is a diagram illustrating an end portion of optical fiber array 10 in optical-axis direction D1. As illustrated in FIGS. 2 and 3, for example, a plurality of single-core fibers 20 are bundled in a ferrule 23. As an example, four single-core fibers 20 are inserted into ferrule 23. For example, the plurality of single-core fibers 20 are arranged so as to form a quadrangular shape (a square shape as an example) in a plane orthogonal to optical-axis direction D1. The plurality of single-core fibers 20 are in contact with each other. Adhesive 24 is filled between the plurality of single-core fibers 20.

Each of single-core fiber 20 is a thermally expanded core (TEC) fiber. Each of single-core fiber 20, which are TEC fibers, includes, in distal end surface 25, beam expanding portion 26 in which a beam diameter of light propagating in core 21 is expanded. For example, beam expanding portion 26 is a core expanding portion including tapered core portion 26b in which core 21 is expanded in a tapered shape. In this case, since core 21 is expanded at distal end surface 25, an MFD of a light propagating in each of single-core fiber 20 is expanded in a direction orthogonal to optical-axis direction D1 at distal end surface 25. As an example, an MFD of single-core fiber 20 is expanded from 10 μm to 30 μm.

A diameter (cladding diameter) of cladding 22 of each of single-core fiber 20 in beam expanding portion 26 decreases toward distal end surface 25. Each of single-core fiber 20 has a reduced diameter portion 27 in which the cladding diameter decreases toward distal end surface 25, and in reduced diameter portion 27, the cladding diameter of each of single-core fiber 20 decreases toward distal end surface 25. As an example, a cladding diameter C1 of each of single-core fiber 20 is 125 μm, and a cladding diameter C2 in distal end surface 25 is 120 μm.

Ferrule 23 is made of, for example, glass. However, a material of ferrule 23 is not limited to glass. Ferrule 23 may be formed of ceramic such as zirconia (ZrO2). Ferrule 23 includes optical fiber holding hole 28 into which the plurality of single-core fibers 20 are inserted and end surface 29 in which optical fiber holding hole 28 opens.

Optical fiber holding hole 28 extends in optical-axis direction D1 of each of single-core fiber 20. Optical fiber holding hole 28 penetrates ferrule 23 in optical-axis direction D1. Distal end surface 25 of each of single-core fiber 20 is exposed in end surface 29. For example, end surface 29 of ferrule 23 is flush with distal end surface 25 of each of single-core fiber 20. That is, end surface 29 and distal end surfaces 25 are located on the same plane.

Optical fiber holding hole 28 has tapered portion 28b whose inner diameter decreases toward end surface 29. In tapered portion 28b, the inner diameter of optical fiber holding hole 28 of ferrule 23 decreases toward end surface 29. An inclination angle θ of tapered portion 28b with respect to optical-axis direction D1 is, for example, from 0.05° to 1°. Distal end surfaces 25 of single-core fibers 20 abut against tapered portion 28b.

A shape of optical fiber holding hole 28 in end surface 29 viewed in optical-axis direction D1 is, for example, a circular shape. In this case, a plurality of (for example, four) single-core fibers 20 are disposed in optical fiber holding hole 28 having a circular shape. The plurality of single-core fibers 20 are in contact with each other inside optical fiber holding hole 28. Distal end surface 25 of each of single-core fiber 20 is in contact with an inner surface 28c of optical fiber holding hole 28. Adhesive 24 is filled between the plurality of single-core fibers 20.

Figure 4:
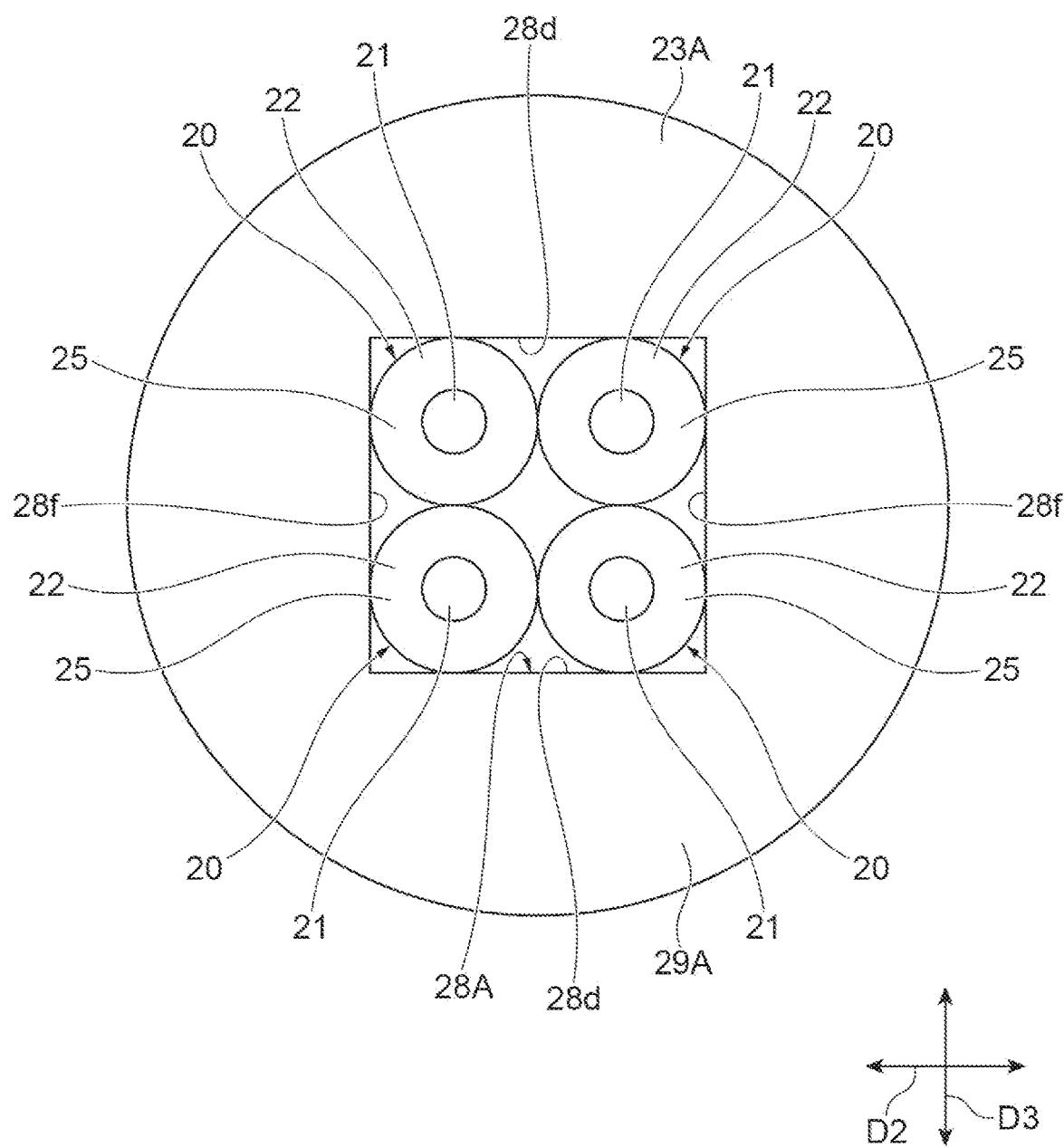
FIG. 4 is a diagram illustrating a ferrule and single-core fibers according to a modification.

FIG. 4 is a side view of an end surface 29A of a ferrule 23A according to a modification viewed in optical-axis direction D1. A shape of an optical fiber holding hole 28A in end surface 29A viewed in optical-axis direction D1 may be a polygonal shape. FIG. 4 illustrates an example in which a shape of optical fiber holding hole 28A in end surface 29A viewed in optical-axis direction D1 is a quadrangular shape. In this case, the plurality of single-core fibers 20 are disposed in optical fiber holding hole 28A having a quadrangular shape.

For example, a shape of optical fiber holding hole 28A viewed in optical-axis direction D1 is a rectangular shape having a pair of first sides 28d extending in a first direction D2 orthogonal to optical-axis direction D1, and a pair of second sides 28f extending in a second direction D3 orthogonal to both optical-axis direction D1 and first direction D2. Distal end surface 25 of each of single-core fiber 20 is in contact with one side of the pair of first sides 28d and one side of the pair of second sides 28f of optical fiber holding hole 28A, for example.

Figure 5:
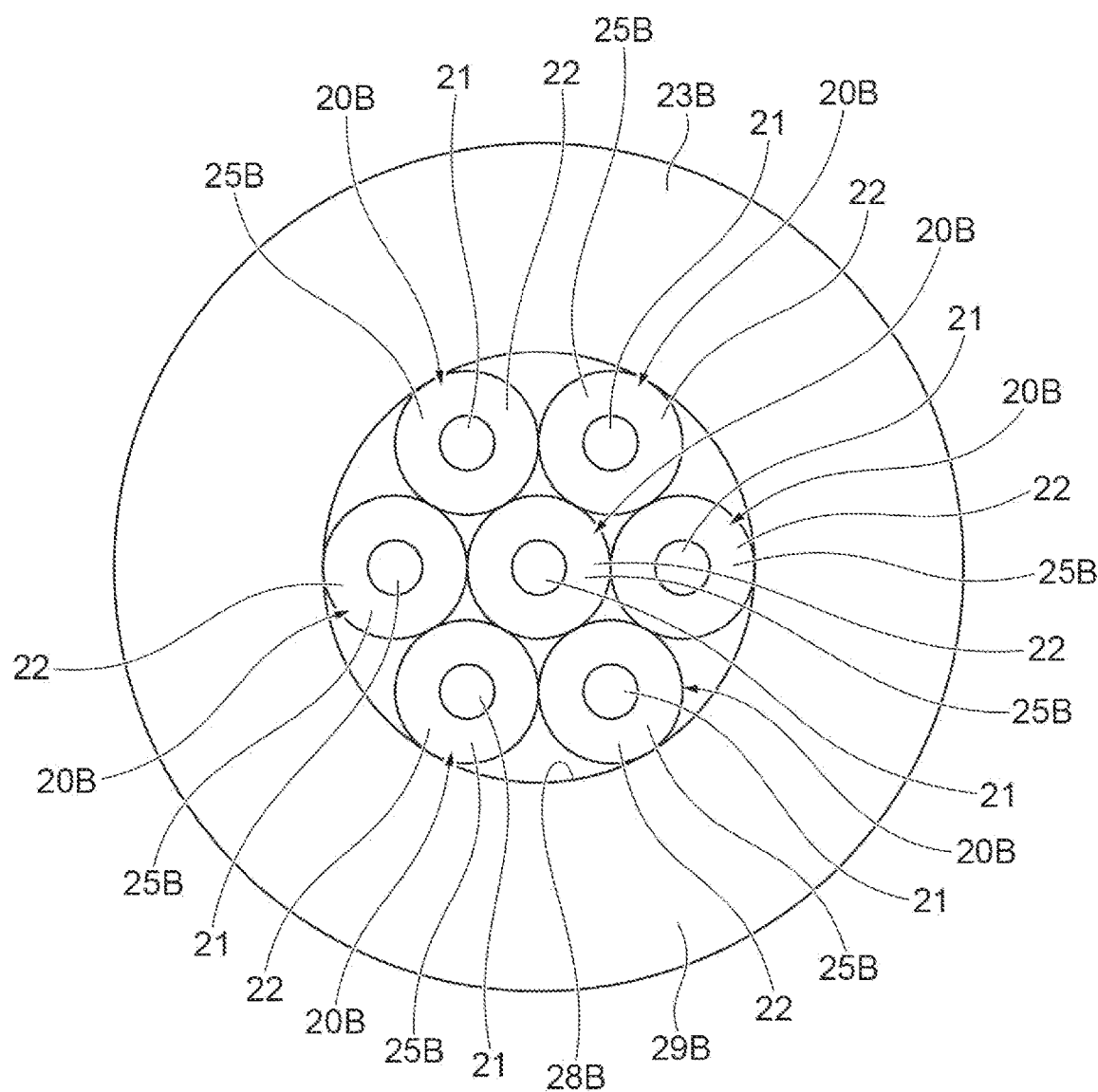
FIG. 5 is a diagram illustrating a ferrule and single-core fibers according to a modification.

FIG. 5 is a side view of an end surface 29B of a ferrule 23B and a distal end surface 25B of each of single-core fiber 20B according to another modification viewed in optical-axis direction D1. In the example of FIG. 5, seven single-core fibers 20B are disposed in an optical fiber holding hole 28B having a circular shape. Seven single-core fibers 20B are inserted into optical fiber holding hole 28B having a circular shape.

Figure 6:
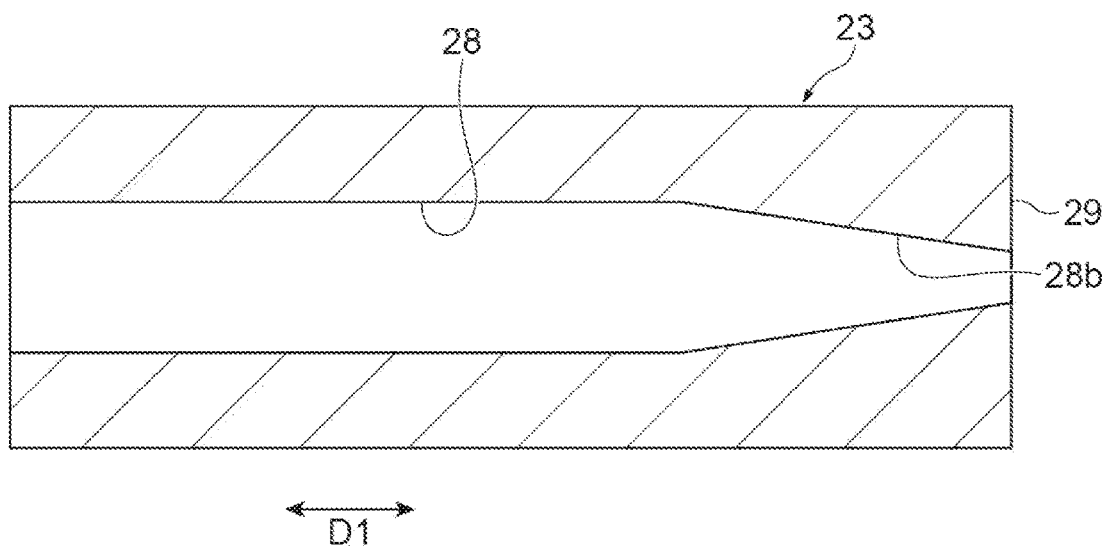
FIG. 6 is a side cross-sectional view of a ferrule according to an embodiment.

FIG. 6 is a cross-sectional view of ferrule 23 taken along a plane extending in optical-axis direction D1. In the example of FIG. 6, tapered portion 28b is formed in a region including end surface 29 of optical fiber holding hole 28. That is, tapered portion 28b is formed in a part of optical fiber holding hole 28.

Figure 7:
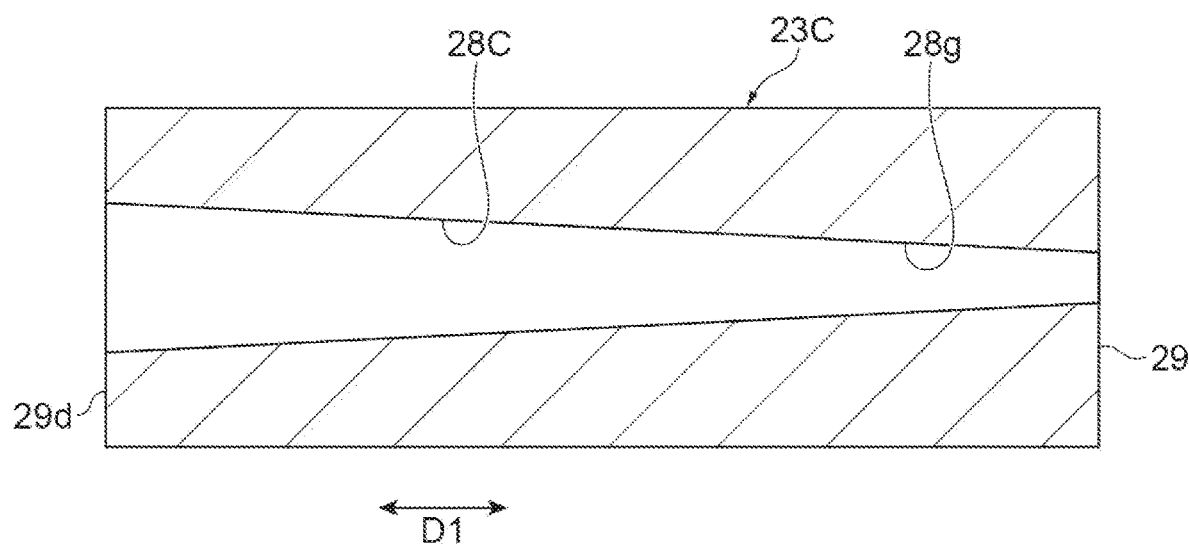
FIG. 7 is a side cross-sectional view of a ferrule according to a modification.

However, as in a ferrule 23C according to the modification illustrated in FIG. 7, an optical fiber holding hole 28C may have a tapered portion 28g that extends from one end to the other end of optical-axis direction D1. That is, tapered portion 28g may extend from an other end surface 29d located on a side opposite to end surface 29 of ferrule 23C to end surface 29.

Figure 8:
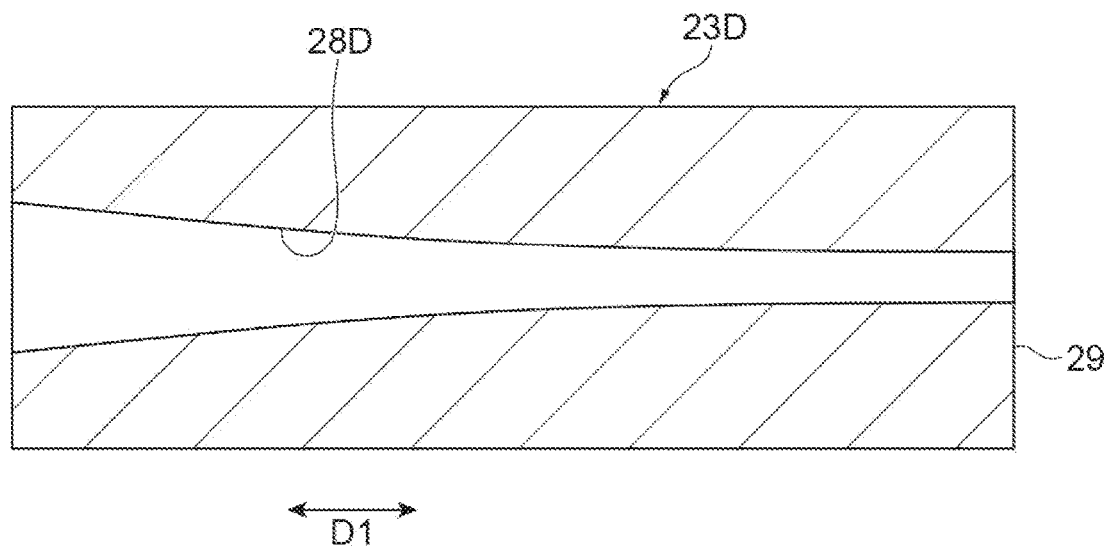
FIG. 8 is a side cross-sectional view of a ferrule according to a modification.

Further, as in a ferrule 23D according to another modification illustrated in FIG. 8, an optical fiber holding hole 28D may be curved in a cross section of ferrule 23D taken along a plane extending in optical-axis direction D1. In the example of FIG. 8, inclination angle θ of optical fiber holding hole 28D decreases toward end surface 29 in the cross section of ferrule 23D.

Figure 9:
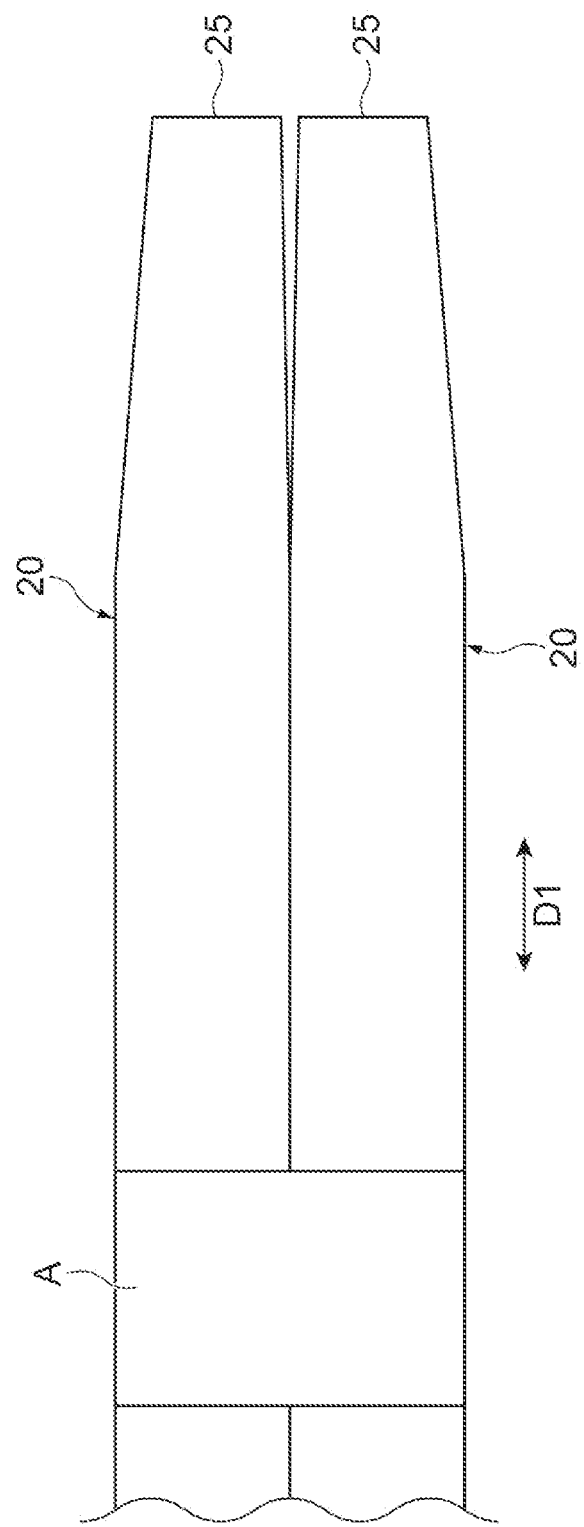
FIG. 9 is a diagram illustrating a method of assembling an optical fiber array according to an embodiment.

Next, an example of an assembly method of assembling an optical fiber array according to the present embodiment will be described. First, as illustrated in FIG. 9, single-core fibers 20 which are TEC fibers are prepared. For example, a plurality of single-core fibers 20 are prepared in which a MFD of distal end surface 25 of each of single-core fiber 20 is expanded by diffusing an doped material by a burner or arc discharge. The plurality of single-core fibers 20 are bundled using an adhesive A. At this time, a position of distal end surface 25 of each of the plurality of single-core fiber 20 is aligned with each other in optical-axis direction D1.

Figure 10:
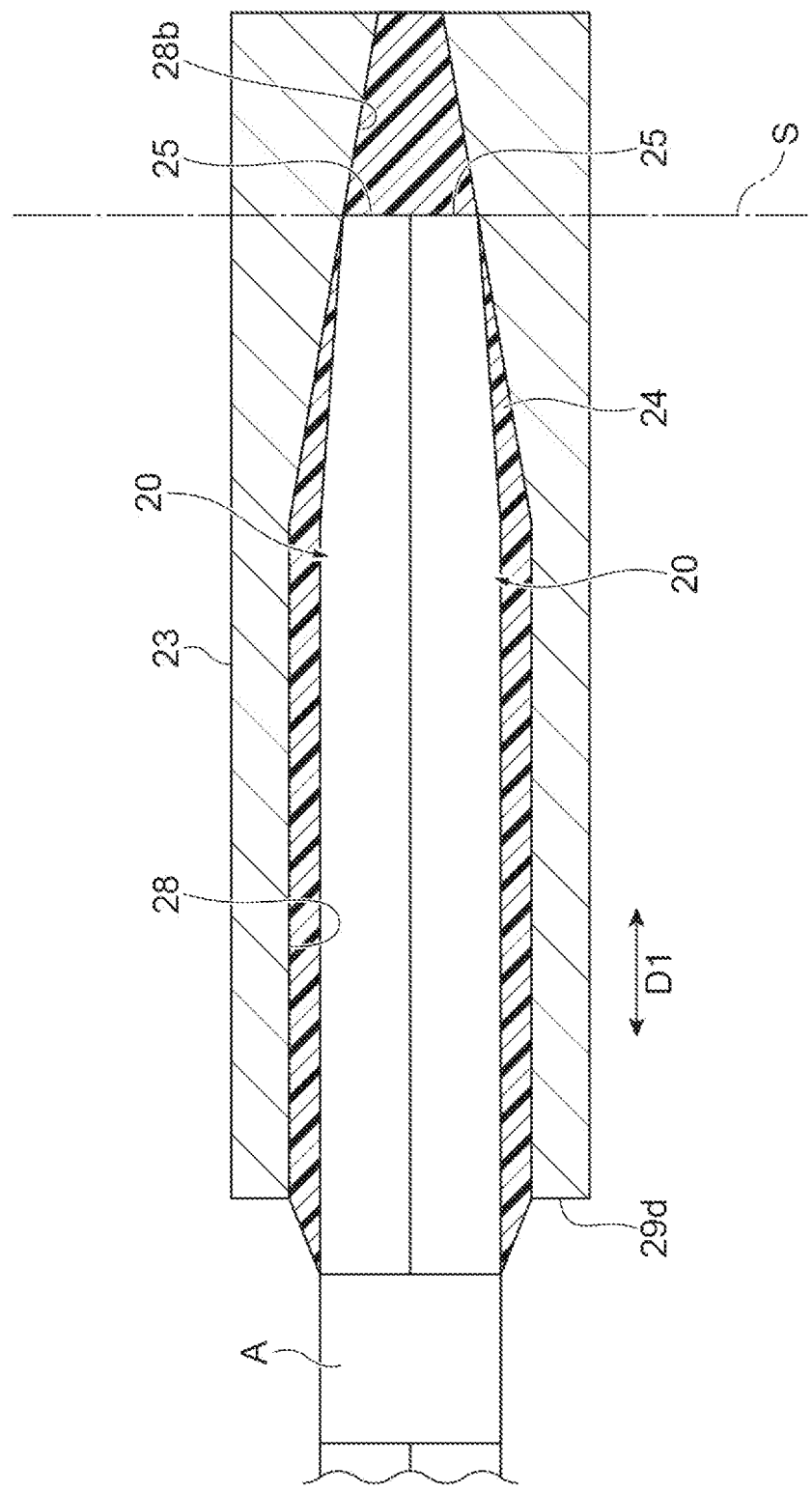
FIG. 10 is a diagram for explaining a method of assembling an optical fiber array according to an embodiment.

Next, as illustrated in FIG. 10, the plurality of single-core fibers 20 are inserted into optical fiber holding hole 28 of ferrule 23. The plurality of single-core fibers 20 are inserted into optical fiber holding hole 28 from other end surface 29d of ferrule 23. Distal end surfaces 25 of the plurality of single-core fibers 20 inserted into optical fiber holding hole 28 abut against tapered portion 28b of optical fiber holding hole 28. Adhesive 24 is filled into optical fiber holding hole 28 in a state in which distal end surfaces 25 of single-core fibers 20 abut against tapered portion 28b of optical fiber holding hole 28.

After adhesive 24 filled in optical fiber holding hole 28 is cured, ferrule 23 is polished. Ferrule 23 and adhesive 24 are polished until distal end surface 25 of each of single-core fiber 20 of ferrule 23 is exposed (for example, until polishing reaches a polishing surface S indicated by a dashed-dotted line in FIG. 10). As illustrated in FIG. 2, after distal end surface 25 of each of the plurality of single-core fibers 20 is exposed, and end surface 29 of ferrule 23 is aligned with distal end surface 25 of each of single-core fiber 20, the assembly of optical fiber array 10 is completed.

Next, advantageous effects obtained from optical fiber array 10 and optical fiber connection structure 1 according to the present embodiment will be described. In optical fiber array 10, each of a plurality of single-core fibers 20 has distal end surface 25, and beam expanding portion 26 that can expand a MFD of light propagating in core 21 is formed in distal end surface 25. The plurality of single-core fibers 20 are inserted into optical fiber holding hole 28 of ferrule 23, and are held in ferrule 23.

A cladding diameter of each of single-core fiber 20 in beam expanding portion 26 decreases toward distal end surface 25. Ferrule 23 has end surface 29 in which optical fiber holding hole 28 opens, and optical fiber holding hole 28 has tapered portion 28b whose inner diameter decreases toward end surface 29. Tapered portion 28b is a portion against which distal end surfaces 25 of single-core fibers 20 abut.

Accordingly, when the plurality of single-core fibers 20 are inserted into optical fiber holding hole 28, distal end surfaces 25 abut against tapered portion 28b. Accordingly, even when the cladding diameter of each of single-core fiber 20 is reduced, the positions of the plurality of single-core fibers 20 can be fixed by causing distal end surfaces 25 to abut against tapered portion 28b. As a result, since the positions of the plurality of single-core fibers 20 can be stabilized, the positional accuracy of the plurality of single-core fibers 20 can be improved.

In the present embodiment, even in single-core fibers 20 each having reduced diameter portion 27 in which a cladding diameter of beam expanding portion 26 decreases toward distal end surface 25, positional shifts of single-core fibers 20 in optical fiber holding hole 28 can be suppressed. As a result, since a pitch (interval) of cores 21 in the plurality of single-core fibers 20 is stable, a coupling loss in single-core fibers 20 can be reduced, and a coupling loss of light in optical fiber connection structure 1 can also be reduced. Therefore, also in optical fiber connection structure 1 including optical fiber array 10 according to the embodiment, the same advantageous effects as those of optical fiber array 10 can be obtained.

In optical fiber array 10 according to the present embodiment, the plurality of single-core fibers 20 are in contact with each other. In this case, a gap formed between the plurality of single-core fibers 20 is reduced since the plurality of single-core fibers 20 are in contact with each other. As a result, the positional accuracy of the plurality of single-core fibers 20 can be further improved.

A sectional shape of tapered portion 28b in a plane orthogonal to optical-axis direction D1 of the plurality of single-core fibers 20 may be a circular shape. In this case, tapered portion 28b of optical fiber holding hole 28 can be formed in a simple shape.

A sectional shape of tapered portion 28b in a plane orthogonal to optical-axis direction D1 of the plurality of single-core fibers 20 may be a polygonal shape.

In optical fiber array 10 according to the present embodiment, an inclination angle $\theta$ of tapered portion 28b with respect to optical-axis direction D1 of the plurality of single-core fibers 20 is from 0.05° to 1°. In this case, since inclination angle $\theta$ of tapered portion 28b with respect to optical-axis direction D1 is 0.05° or more, distal end surfaces 25 of single-core fibers 20 inserted into optical fiber holding hole 28 can abut against tapered portion 28b. Since inclination angle $\theta$ of tapered portion 28b with respect to optical-axis direction D1 is 1° or less, inclination angle $\theta$ of tapered portion 28b of optical fiber holding hole 28 can be prevented from becoming excessively large.

Ferrule 23 may be made of glass. In this case, the ferrule made of glass can be fabricated by a liquid etching process using hydrofluoric acid or the like, and a tapering treatment can also be performed. Since a linear expansion coefficient of ferrule 23 made of glass is close to a linear expansion coefficient of an optical fiber, for example, characteristics of optical fiber array 10 including ferrule 23 made of glass are more stable with respect to a change in environmental temperature.

Ferrule 23 may be made of ceramic. In this case, ferrule 23 can be easily manufactured by molding, for example, by mixing a ceramic powder with a liquid to form a slurry and pouring the slurry into a die. For example, ferrule 23 having a tapered tip portion can be easily manufactured by preparing a die having a tapered tip portion.

The embodiments of optical fiber array and optical fiber connection structure according to the present disclosure have been described above. However, the present invention is not limited to the embodiments described above. That is, it is easily recognized by those skilled in the art that various modifications and changes can be made to the present invention within the scope of the gist described in the claims. For example, the shape, size, material, number, and arrangement of each part of the optical fiber array and the optical fiber connection structure can be changed as appropriate within the scope of the above gist. For example, in the above-described embodiments, an example in which the normal line of distal end surface 34 of multicore fiber 30 and the normal line of distal end surface 25 of each of single-core fiber 20 are inclined with respect to optical-axis direction D1 is described. However, at least one of the normal line of the distal end surface of the multicore fiber or the normal line of the distal end surface of each of the single-core fiber may not be inclined with respect to the optical-axis direction. As described above, the orientation of the distal end surface can be changed as appropriate.

What is claimed is:
1. An optical fiber array comprising:
  a plurality of single-core fibers each having a core and a cladding and each having, in a distal end surface thereof, a beam expanding portion capable of expanding a mode field diameter of light propagating in the respective core; and a ferrule having an optical fiber holding hole into which the plurality of single-core fibers are inserted, and an end surface in which the optical fiber holding hole opens,
wherein a cladding diameter of each of the single-core fibers in the beam expanding portion decreases toward the distal end surface, and
wherein the optical fiber holding hole has a tapered portion whose inner diameter decreases toward the end surface and against which the distal end surfaces of the plurality of single-core fibers abut.

2. The optical fiber array according to claim 1,
wherein the plurality of single-core fibers are in contact with each other at the distal end surfaces.

3. The optical fiber array according to claim 1,
wherein a sectional shape of the tapered portion in a plane orthogonal to an optical-axis direction of the plurality of single-core fibers is a circular shape.

4. The optical fiber array according to claim 1,
wherein a sectional shape of the tapered portion in a plane orthogonal to an optical-axis direction of the plurality of single-core fibers is a polygonal shape.

5. The optical fiber array according to claim 1,
wherein an inclination angle of the tapered portion with respect to an optical-axis direction of the plurality of single-core fibers is from 0.05° to 1°.

6. The optical fiber array according to claim 1,
wherein the ferrule is made of glass.

7. The optical fiber array according to claim 1,
wherein the ferrule is made of ceramic.

8. The optical fiber array according to claim 1,
wherein each of the plurality of single-core fibers is a thermally expanded core fiber.

9. The optical fiber array according to claim 1,
wherein the beam expanding portion is a core expanding portion having a tapered core.

10. The optical fiber array according to claim 1,
wherein a mode field diameter of the plurality of single-core fibers is expanded from 10 µm to 30 µm.

11. The optical fiber array according to claim 1,
wherein the tapered portion is formed in a region including the end surface of the optical fiber holding hole.

12. The optical fiber array according to claim 1,
wherein the plurality of single-core fibers are bundled using an adhesive.

13. The optical fiber array according to claim 12,
wherein the adhesive is filled into the optical fiber holding hole in a state in which the distal end surfaces of the plurality of single-core fibers abut against the tapered portion of the optical fiber holding hole.

14. An optical fiber connection structure comprising:
the optical fiber array according to claim 1;
a multicore fiber;
a first lens facing the optical fiber array; and
a second lens disposed between the first lens and the multicore fiber.

* * * * *